United States Patent [19]
Kato

[11] 3,923,204
[45] Dec. 2, 1975

[54] APPARATUS FOR STORAGE AND DISCHARGE OF FLOWABLE SOLID MATERIALS

[76] Inventor: Yasuhiro Kato, 808 Shigaichi-Jutaku, 117 Jinmei-cho, Chiba, Japan

[22] Filed: Apr. 25, 1974

[21] Appl. No.: 464,115

[30] Foreign Application Priority Data
Apr. 27, 1973   Japan.................................. 48-47206

[52] U.S. Cl...................................... 222/228; 259/5
[51] Int. Cl.² ......................................... G01F 11/00
[58] Field of Search ............ 222/225, 226, 228, 231, 222/236, 414, 233, 234; 259/5, 21, 40

[56] References Cited
UNITED STATES PATENTS

| | | | |
|---|---|---|---|
| 2,228,421 | 1/1941 | Taylor.................................. | 222/228 |
| 2,345,063 | 3/1944 | Nauta .................................. | 259/40 |
| R24,079 | 10/1955 | Mateet................................. | 222/333 |

FOREIGN PATENTS OR APPLICATIONS

| | | | |
|---|---|---|---|
| 1,041,619 | 9/1966 | United Kingdom..................... | 259/5 |
| 1,910,710 | 9/1970 | Germany ............................. | 222/226 |

Primary Examiner—Robert B. Reeves
Assistant Examiner—H. Grant Skaggs
Attorney, Agent, or Firm—Sherman & Shalloway

[57] ABSTRACT

An apparatus for storage and discharge of flowable solid materials such as powders, granules and grains in which flowable solid materials which have been stored in a storage tank can be discharged outside smoothly and completely at a prescribed constant rate regardless of kinds of flowable solid materials stored and such conditions as temperature and humidity are disclosed. This apparatus comprises a storage tank having in the upper portion thereof a space for storing flowable solid materials and in the lower portion thereof a zone for discharging flowable solid materials. A discharge mechanism is disposed in the interior of the storage tank, and the discharge mechanism includes a drive shaft disposed in the upper portion of the storage tank in the axial direction of the tank, an end member mounted rotatably on said discharge zone of the storage tank in a bearing mechanism and a spiral spring member. One end of the spring member is fitted to the drive shaft and the other end extends to the end member. The discharge mechanism is so constructed that when said drive shaft is rotated, said spring member is rotated by rotation of said drive shaft and concurrently is revolved along the inner wall of the storage tank.

16 Claims, 6 Drawing Figures

APPARATUS FOR STORAGE AND DISCHARGE OF FLOWABLE SOLID MATERIALS

BACKGROUND OF THE INVENTION

1. Field of the Invention

This invention relates to an apparatus for storage and discharge of flowable solid materials. More particularly, the invention relates to an apparatus for storage and discharge of flowable solid materials such as powders, granules and grains in which occurrence of undesired phenomena caused during storage or on discharge of such flowable solid materials such as chalking, bridging and caking is controlled and these flowable solid materials can be smoothly discharged from the apparatus.

2. Prior Art and Technical Considerations

In various chemical plants, mine fields, cement mills, refineries, flouring mills and other industrial factories, flowable solid materials, which are starting materials, intermediate products or final end products, are stored in storage tanks and discharged therefrom as occasion demands. When flowable solid materials such as powders, granules and grains are discharged from storage tanks, it is frequently observed that they clog in the vicinity of discharge ports or they are left in the form of a bridge in portions above discharge ports. Therefore, it is frequently difficult to discharge these materials from storage tanks all at once or continuously at a constant rate. In the instant specification and claims, by the term "flowable solid materials" is meant fine solid materials having a flowability, in which such phenomena as chalking, caking, bridging and clogging are readily caused to occur when they are stored in storage tanks.

Various means for preventing occurrence of chalking, bridging and clogging of flowable solid materials in storage tanks have heretofore been proposed, but none of them achieves satisfactory results. For instance, a method comprising imparting vibrations to an inner wall of a storage tank by means of a vibrator provided outside the storage tank and discharging them from the tank by the so given vibrations is broadly adopted in the art. According to this method, however, some granules or powders are rather packed in the tank by such vibration. Further, noises generated by the vibrator have bad influences on working surroundings and this method using a vibrator is not preferred in view of the energy efficiency. There is also adopted a method in which air is blown into the storage tank from the outside to prevent flowable solid materials from sticking on the wall surface of the tank. In this method, however, provision of special means and tubings for feeding and transporting compressed air is necessary, and when water is contained in air or flowable solid materials contain a small amount of water, holes are formed only in portions corresponding with air blowing nozzles and it is difficult to discharge them uniformly from the tank, with the result that the intended object cannot be attained. An apparatus having a rotary table installed in the vicinity of a discharge port has been used as an apparatus for storage and discharge of flowable solid materials. In this apparatus, however, a motor, a main shaft and other members should be provided in the interior of the storage tank and hence, the effective capacity of the storage tank is reduced. Further, allowability or flexibility of conditions for discharging flowable solid materials from the tank smoothly and effectively without causing such troubles as chalking and bridge is greatly restricted because the angle of repose varies in powders or granules depending on the difference between the temperature in the tank and the temperature of the outer environment and on the season. In the case of an apparatus comprising a vaned screw disposed to extend in the central axial direction of the tank, which is also used for storage and discharge of flowable solid materials, only portions of powders or granules contacted by screw vanes are let to fall and discharged, leaving so-called rat holes in the stored mass, and thus, it is difficult to discharge flowable solid materials stored in the tank, uniformly outside the tank.

As is seen from the foregoing description, conventional means for discharging flowable solid materials from tanks fail to attain sufficiently the object of discharging flowable solid materials completely and smoothly outside tanks, and this defect involved in conventional means is made conspicuous by the fact that properties of flowable solid materials such as friction coefficient and angle of repose vary with changes of such conditions as temperature and humidity. Another fatal defect of conventional means is that it is frequently difficult to effect quantitative discharge of flowable solid materials, namely to discharge flowable solid materials constantly and uniformly at a prescribed rate.

I have found that when a spiral spring member is disposed in a storage tank in the axial direction thereof and the spring member is rotated by means of a suitable driving device such as a motor, the spiral spring member rotates around its own axis and concurrently a revolving movement along the inner wall of the tank is caused in the spiral spring member by the centrifugal force by its rotation around its own axis, and by virtue of this composite movement of the spring member it is made possible to discharge flowable solid materials completely and uniformly at a prescribed rate from the tank regardless of variations of such conditions as temperature and humidity.

OBJECTS OF THE INVENTION

It is therefore a primary object of this invention to provide an apparatus for storage and discharge of flowable solid materials in which flowable solid materials which have been stored in a tank can be discharged outside the tank completely without such troubles as chalking and bridging regardless of variations of such conditions as temperature and humidity.

Another object of this invention is to provide a novel mechanism for discharge of flowable solid materials in which the discharge can be performed completely and uniformly at a prescribed rate by composite movement of rotation and revolution of a rotary spiral spring member.

SUMMARY OF THE INVENTION

In accordance with this invention, there is provided an apparatus for storage and discharge of flowable solid materials which comprises a storage tank having in the upper portion thereof a space for storing flowable solid materials and in the lower portion thereof a zone for discharging flowable solid materials, and a discharge mechanism disposed in the interior of said tank, wherein said discharge mechanism includes a drive shaft disposed in the upper portion of said tank in the axial direction of said tank, an end member mounted rotatably on said discharge zone of the tank through a bearing mechanism and a spiral spring member, one end of which is fitted to said drive shaft and the other end of which extends to said end member, and said discharge mechanism is so constructed that when said drive shaft is rotated, said spring member is rotated by rotation of said drive shaft and concurrently it is revolved along the inner wall of the storage tank.

BRIEF DESCRIPTION OF THE DRAWINGS

This invention will now be described detailedly by reference to embodiments shown in the accompanying drawing, in which.

DESCRIPTION OF THE PREFERRED EMBODIMENTS

Figure 1:
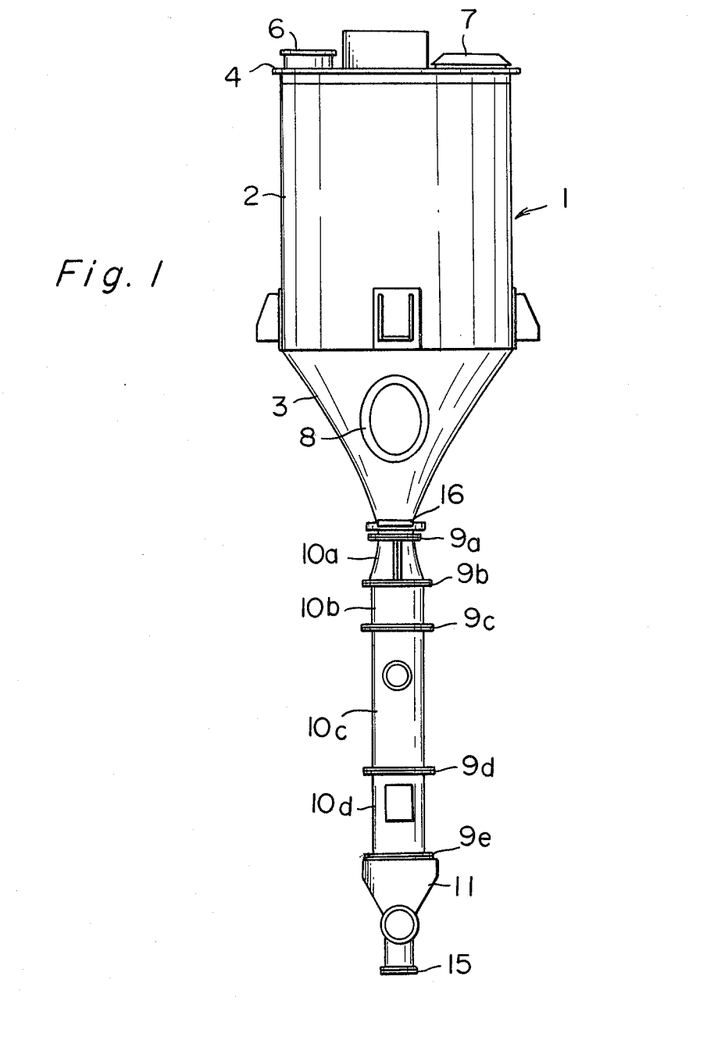
FIG. 1 is a side view illustrating an embodiment of the apparatus of this invention.
Figure 2:
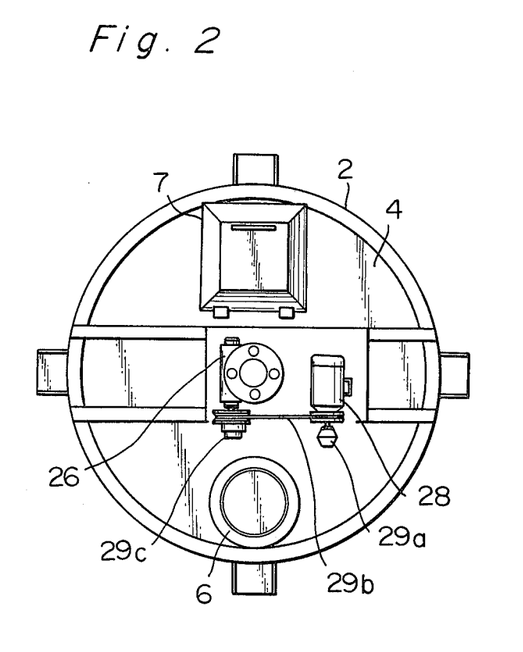
FIG. 2 is a top view of the apparatus shown in FIG. 1.
Figure 3:
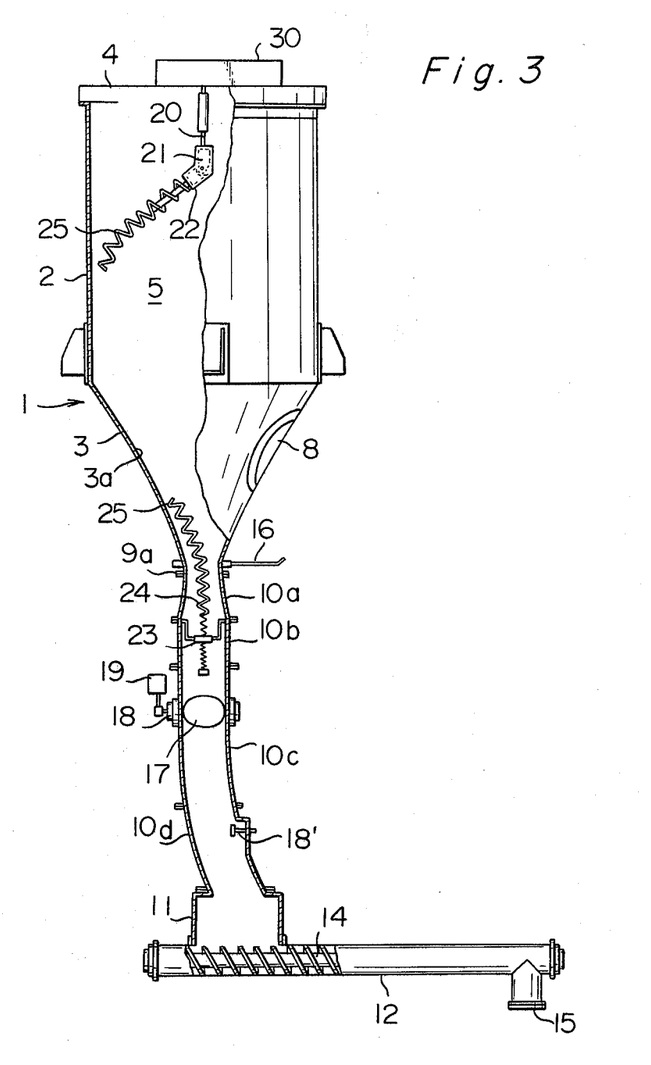
FIG. 3 is a partially sectional side view illustrating the apparatus shown in FIG. 1.

In FIGS. 1 to 3 showing an embodiment of the apparatus of this invention, a storage tank indicated by 1 as a whole, namely a hopper, comprises a cylindrical side wall portion 2, a conical bottom wall portion 3 connected to the lower end of said side wall portion 2, and a lid 4 mounted on the upper end of the side wall portion 2. An inner space 5 defined by these members 2, 3 and 4 is formed in the tank 1 to store flowable solid materials therein. An inlet 6 for introducing flowable solid materials into the storage tank and a closable peep hole 7 are provided on the lid 4 of the tank 1, and another peep window 8 is provided on the conical bottom wall portion 3 of the tank 1.

The discharge zone is formed below the conical bottom wall portion 3. For example, a shute 10a is connected to the lower end of the bottom wall 3 through a flange 9a, and likewise, chutes 10b, 10c and 10d are connected through flanges 9b, 9c and 9d, respectively. The lowermost chute 10d is connected to a metering tank 11 through a lowermost flange 9e, and below the metering tank 11 a screw conveyor is disposed to transport flowable solid materials.

Flowable solid materials which have been stored in the storing space 4 are discharged, as occasion demands, into the metering tank 11 through chutes 10a, 10b, 10c and 10d, and they are temporarily kept in this metering tank. Then, they are transported in the horizontal direction by rotation of a driving screw 14 disposed inside the screw conveyor 12 and discharged outside from a discharge port 15. A suitable mechanism may optionally be disposed to adjust the discharge rate of flowable solid materials. For example, a slide damper 16 is disposed in the vicinity of the lower end of the conical bottom wall 3 of the tank, and a butterfly damper 17 is mounted in the interior of the chute 10c. As means for detecting the discharge rate of flowable solid materials, there is provided an optional detecting member such as a level indicator 18' in the interior of the chute 10d. The butterfly damper 17 is rotatably supported by a bearing mechanism 18, and its rotation angle is adjusted by a drive mechanism such as an air cylinder 19. In response to the signal from the level meter indicator 18', the air cylinder is actuated to adjust the open angle of the butterfly damper 17 so as to control the discharge rate of flowable solid materials.

One of the important features of this invention resides in provision of a discharge mechanism including a spiral spring member in a tank 1 having in the upper portion thereof a storage space 5 and in the lower portion thereof a discharge zone provided with chutes 10a to 10d, which spiral spring member can be rotated around its axis and concurrently revolved along the inner wall of the tank 1.

Figure 4:
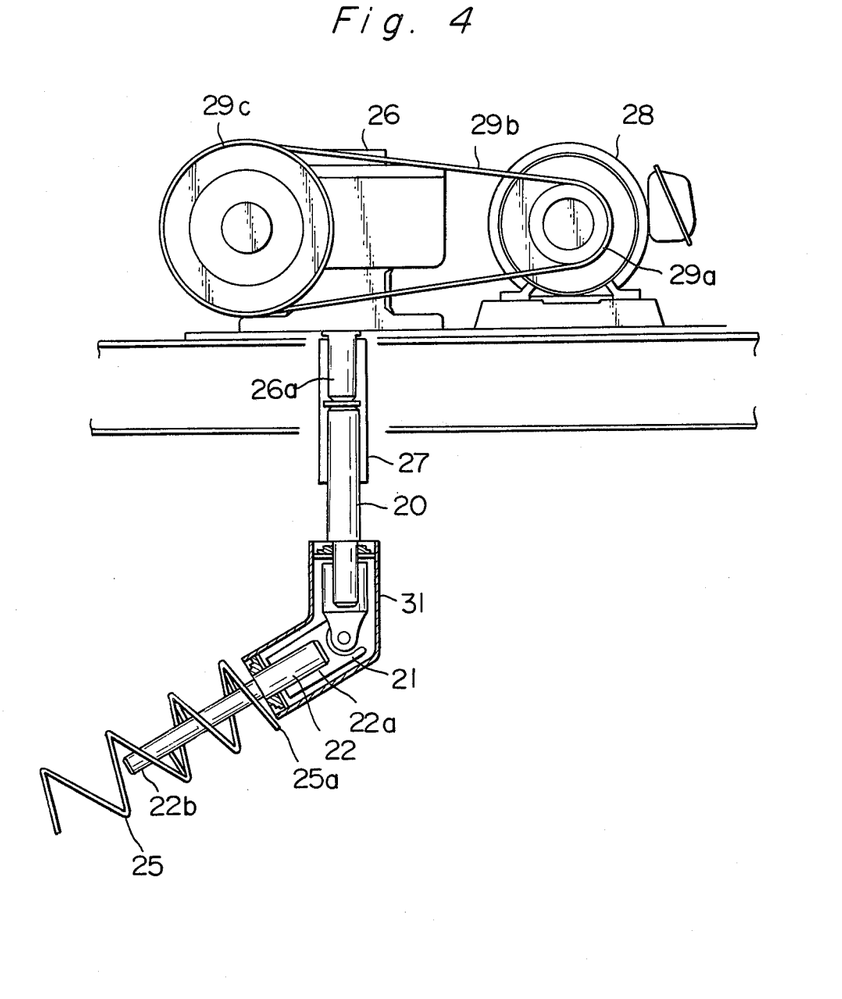
FIG. 4 is an enlarged sectional side view illustrating a drive system to be used in apparatus shown in FIG. 1.
Figure 5:
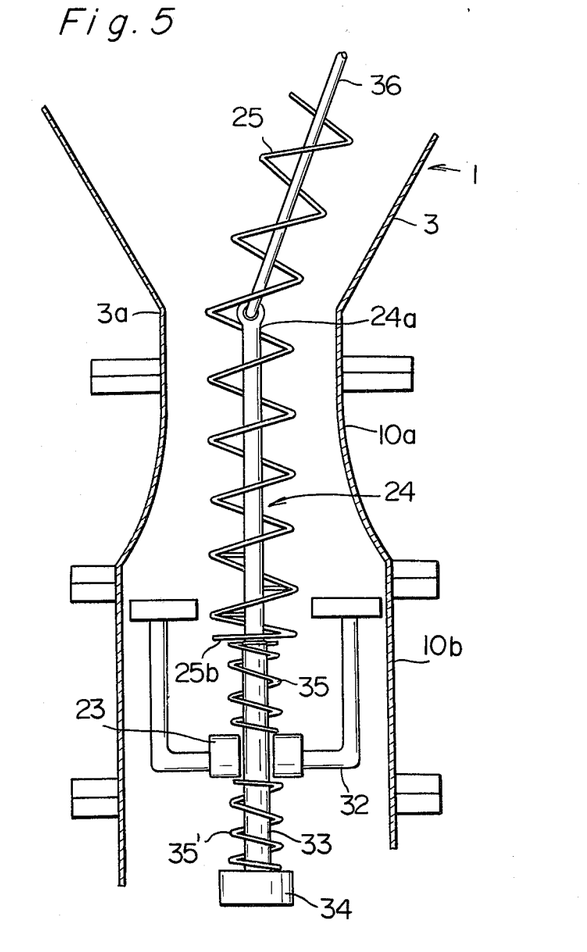
FIG. 5 is an enlarged sectional side view illustrating the discharge zone of the apparatus shown in FIG. 1.

This discharge mechanism including a spiral spring member is now described by reference to FIG. 3 and FIGS. 4 and 5 illustrating enlarged the drive system and discharge zone of FIG. 3, respectively. The discharge mechanism comprises a drive shaft 20 provided in the upper portion of the tank 1 along the axial direction thereof, a supporting member 22 mounted on the lower end of the drive shaft 20, preferably through a universal joint 21, an end member 24 rotatably mounted on the discharge zone 10b of the tank 1 through a bearing mechanism 23, and a spiral spring member 25, one end 25a of which is fixed to the supporting member 22 (see FIG. 4) and the other end 25b of which extends to the end member 24.

A suitable reduction gear 26, such as a worm gear, is mounted on the upper lid 4 of the tank 1 to rotate the drive shaft 20 at an appropriate rate, and the shaft 26a of this reduction gear 26 is connected to the drive shaft 20 by an appropriate coupling mechanism 27.

This reduction gear 26 is driven by a drive motor 28 mounted on the upper lid 4 through a suitable power transmission mechanism such as one including a pulley 29a on the motor side, a belt 29b and a pulley 29c on the reduction gear side. The above-mentioned drive mechanism for driving the drive shaft 20 can be contained in a casing 30 disposed on the upper lid 4 of the tank 1.

Any member that can transmit the rotation of the drive shaft 20 to the supporting member 22 and cause a free displacement of the supporting member 22 with respect to the drive shaft 20 disposed vertically can be used as the universal joint 21 to be attached to the lower end the drive shaft 20. One end 25a of the spiral spring member 25 can be directly fixed to the lower end of the drive shaft 20. In this case, however, it becomes difficult to allow the spiral spring member 25 to revolve freely and smoothly along the inner wall of the tank 1 by the centrifugal force caused by its rotation around its own axis. One end 22a of the supporting member 22 is connected to one joint portion of the universal joint 21 and it is preferred that the other end 22b of the supporting member 22 extends a little in the direction of the central axis of the spiral spring member 25 through the fixed end 25a of the spring member 25. Namely, when the supporting member 22 is arranged as shown in FIG. 4, abrupt bending of the spring member 25 at the point of its fixed end 25a or concentration of stress on said point 25a can be effectively prevented, so that the life of the spring member 25 can be prolonged. Of course, the spiral spring member 25 may be fixed to the supporting member 22 at a plurality of points. A cover 31 composed of an elastic polymer such as rubber or soft resins can be disposed at the portion connecting the drive shaft 20 and the supporting member 22, namely at the point of the universal joint 21, to prevent powders or granules from being introduced into said connecting portion.

In FIG. 5, a bearing mechanism 23 is mounted on the discharge zone of the tank 1, for example, at the chute 10b, through a suitable supporting arm or frame 32. By this bearing mechanism 23, the end member 24 is rotatably supported. The end member 24 extends vertically in agreement with the axial direction of the spiral spring member 25, and the lower end 25b of the spiral spring member 25 is fixed to this end member 24 at one or more points. In this invention, it is preferred that the end member 24 is so disposed that it can move to some extent in the axial direction, i.e., in the vertical direction. For attaining this vertical movement of the end member 24, a vertically movable shaft 33 that can rise and descend with respect to the bearing mechanism 23 is connected to the lower end portion of the end member 24 in the embodiment shown in FIG. 5 and a stopper 34 is provided on the lowermost end of the vertically movable shaft 33. In this structure, the vertical movable shaft 33 is supported by the bearing mechanism 23 so that it can rise and descend freely between the stopper 34 and the lower end 25b of the spring member 25 extending the lower end of the end member 24. In order to prevent an abrupt shock from being given to the bearing mechanism 23 and to maintain the end member 24 at the prescribed proper position, coil springs 35 and 35' acting as shock absorbers are provided around the vertically movable shaft between the stopper 34 and the bearing 23 and between the end 25a of the spring member 25 and the bearing 23, respectively.

If, as shown in the embodiment of FIG. 5, the end member 24 supporting the lower end 25a of the spiral spring member 25 is disposed so that it can move up and down to some extent, prominent advantages can be attained as regards the smooth discharge operation and the prolongation of the life of the spring member 25. More specifically, an upward thrust force is imposed on the spring member 25 by its rotation or revolution, and under this upward thrust force, the spring member 25 exhibits an inclination for upward movement. This inclination can be regulated to some extent by its own flexibility and the spring member 25 can be restored to the ordinary normal state. However, when deformation of the spring member 25 by its elongation and contraction under the above-mentioned thrust force becomes too great, the pitch of the spiral member 25 is changed and it is difficult to discharge flowable solid materials uniformly and smoothly. Further, there are brought about such troubles as permanent deformation of the spring member 25 or breakage of the spring member 25 by the shock caused when the spring 25 is restored to the ordinary state. In contrast, when the end member 24 supporting the lower end portion of the spring member 25 is disposed, as in FIG. 5, so that it can move up and down within a certain range, the end member 24 per se is allowed to move upwardly when such thrust force is imposed on the spring member 25, and the deformation of the spring member 25 by its elongation and contraction is relaxed and the pitch (namely the degree of elongation or contraction of the spring member is restored to the ordinary normal state. Thus, in this preferred embodiment, discharge of flowable solid materials can be accomplished more smoothly and uniformly and the life of the spring member can be further prolonged.

In the embodiment shown in FIG. 5, it is preferred that when the end member 24 extending in the vertical direction is at the ordinary supporting position (the position shown in FIG. 5), the top end 24a of the end member 24 is positioned at an opening mounted at the lower end of the conical bottom wall portion 3, and a spring-indicating shaft 36 extending in the axial direction of the spiral member 25 is mounted on the top end 24a of the end member so that the shaft 36 can oscillate with respect to the end member 24. If connection of the spiral spring member 25 and the end member 24 is performed in the foregoing manner, when a thrust force is imposed on the spring member 25, the top end of the vertical end member 24 moves upwardly, and hence, frictional contact of the spiral spring member 25 with the lower end edge 3a of the conical bottom wall portion 3 can be effectively prevented. Further, abrupt bending of the spring member 25 at this portion or concentration of stress on this portion can be effectively expelled by the spring-indicating shaft 36. Thus, in this embodiment, breakage of the spring member 25 can be effectively prevented and its life can be prolonged.

The apparatus of this invention for storage and discharge of flowable solid materials can be adapted to optional apparatus and machines handling flowable solid materials. When flowable solid materials are charged into the apparatus of this invention for storage, the slide damper 16 or butterfly damper 17 is closed and flowable solid materials are filled into the tank 1 from an inlet 6 mounted on the lid 4 of the tank 1. When flowable solid materials which have been stored in the tank 1 are discharged, the slide damper 16 and butterfly damper 17 are opened, and a driving motor 28 is actuated. The driving power of the motor 28 is transmitted to the worm gear 26 through transmission means 29a, 29b and 29c, and the drive shaft 20 is thus driven and rotated. With rotation of the drive shaft 20, the sprial spring member 25, which is connected to the drive shaft 20 through the supporting member 22 and universal joint 21, is also rotated around its own axis.

The direction of rotation of the spiral spring member 25 is in agreement with the spiralling direction of the spring member 25 seen from above.

Upon rotation of the spiral spring member 25 around its own axis in the space 5 in which flowable solid materials have been stored, the spiral spring member 25 exerts such action that flowable solid materials present in the interior of the spring member and those present at such positions as having contact with the rotating spring member are extruded downwardly along the spring member 25. Further, when the spiral spring member 25 is thus rotated around its own axis, a force of driving the spring member 25 in the cross-sectional direction of the tank is caused by frictional contact of the member 25 with flowable solid materials or the inner wall of the tank and by centrifugal force resulting from the rotation of the member 25 around its own axis. Namely, revolution along the inner wall of the tank 1 takes place in the spiral spring member 25 concurrently with rotation around its own axis. When flowable solid materials are packed in the storage space 5, the revolution of the spiral spring member 25 gradually proceeds while wearing out packed flowable solid materials with which the spring member 25 is brought into contact during rotation revolution. Of course, the spring member 25 continues the rotation around its axis while it is revolved along the inner wall of the tank 1.

When a spiral spring member which is rich in flexibility is positively driven and rotated in the storage space 5 of the store tank 1 in the state fixed to both the upper end and lower end (discharge end) of the tank 1, free and smooth revolution of the spiral spring member 25 is attained concurrently with the rotation around its own axis, with the result that the action of wearing out or shaving the packed flowable solid materials and the action of discharging the flowable solid materials downwardly can be simultaneously exerted by the spiral spring member 25. Thus, according to this invention, discharge of flowable solid materials can be accomplished smoothly and continuously at a prescribed rate without such troubles as chalking and bridging.

Another prominent advantage attained by this invention is that the operation of discharge of flowable solid materials can be performed with great flexibility even when such factors as the packed or stored amount of flowable solid materials and the pack density, repose angle and other properties of flowable solid materials are changed within extremely broad ranges. More specifically, when flowable solid materials are sufficiently filled or closely packed in the tank 1, the spring member is gradually revolved along the inner wall of the tank 1 while wearing out the flowable solid materials and hence, the discharge operation can be effectively accomplished without an excessive load being imposed on the spring member or driving motor. Further, when parts of flowable solid materials have been discharged leaving so-called rat holes, the spring member can be revolved considerably freely to attack perpetually the remaining flowable solid materials, and therefore, shaving of the flowable solid materials can be performed assuredly. Such great flexibility of the discharge operation attained in the apparatus of this invention cannot be expected from conventional discharge apparatus including agitation vanes.

In this invention, it is not always indispensable that the direction of revolution of the spiral spring member 25 should be in agreement with the rotation direction of the drive shaft 20. In case the spring member 25 is driven without having any friction with the inner wall of the tank or flowable solid materials, the spring member 25 tends to revolve in the same direction as the rotation direction of the drive shaft 20. However, when the spiral spring member 25 is driven in the state having frictional contact with the inner wall of the tank or flowable solid materials, an upward thrust force is imposed on the spring member 25 and it tends to revolve in the direction reverse to the rotation direction of the drive shaft 20. Thus, in the apparatus of this invention, by virtue of the flexibility or elasticity of the spring member, the spring member can be revolved in an optional direction. Namely, a part or all of the spring member can be revolved either in the same direction as the rotation direction of the drive shaft or in the direction reverse to the rotation direction of the drive shaft. Such revolutionary movement is inherent in coil springs.

In the apparatus of this invention, even when an upward thrust force is imposed on the spiral spring member 25, by restitution power by its own elastic characteristics or its reverse rotation, or by the action of the vertically movable shaft 33 and shock-absorbing springs 35 and 35' detailed by reference to FIG. 5, the spiral spring member is readily restored to the ordinary normal state.

The rotation rate of the drive shaft 20 is determined appropriately in view of the capacity of the tank, the desired rate of discharge of flowable solid materials and the spiral configuration of the spiral spring member, and it is generally preferred that the rotation rate is suitably chosen within a range of 30 to 100 rpm. Dimensions of the spiral spring member are determined appropriately based on the capacity and height of the sotrage and discharge apparatus and other factors, and it is generally preferred that the spiral spring member has the following dimensions:

Spiral diameter: 120 to 135 mm
Spiral pitch (standard state) : 40 to 55 mm
Diameter of spring wire : 5 to 8 mm

Any of linear or band-like metal materials excellent in elasticity and abrasion resistance, such as wires and bands of carbon steel, manganese-chromium steel, molybdenum steel, stainless steel and phosphorus bronze, can be used as a material constituting the spiral spring member 25. A coating of a rubber or resin excellent in abrasion resistance, such as polytetrafluoroethylene, polyvinyl fluoride and other synthetic rubbers can be applied to the surface of the spiral spring 25. If such resin or rubber coating is applied to the portion of the spring member that is positioned in the vicinity of the boundary area between the bottom face portion of the tank and the discharge zone, better results can be obtained as regards prevention of abrasion of the spring member.

The vertical section of the conical bottom wall portion 3 of the tank 1 may be linear but in order to attain uniform contact between the inner surface of the bottom wall portion 3 and the spiral spring member 25, it is preferred that, as shown in FIG. 3, the vertical section of the bottom wall portion 3 forms an convexed curve 3a.

In this invention, in order to prevent breakage or permanent deformation of the spiral spring member 25, it is preferred to provide the end member 24 so that it can move in the vertical direction and to arrange the drive shaft 20 supporting one end of the spiral spring member so that the shaft can move vertically in the axial direction to some extent. This feature is described by reference to FIG. 6.

Figure 6:
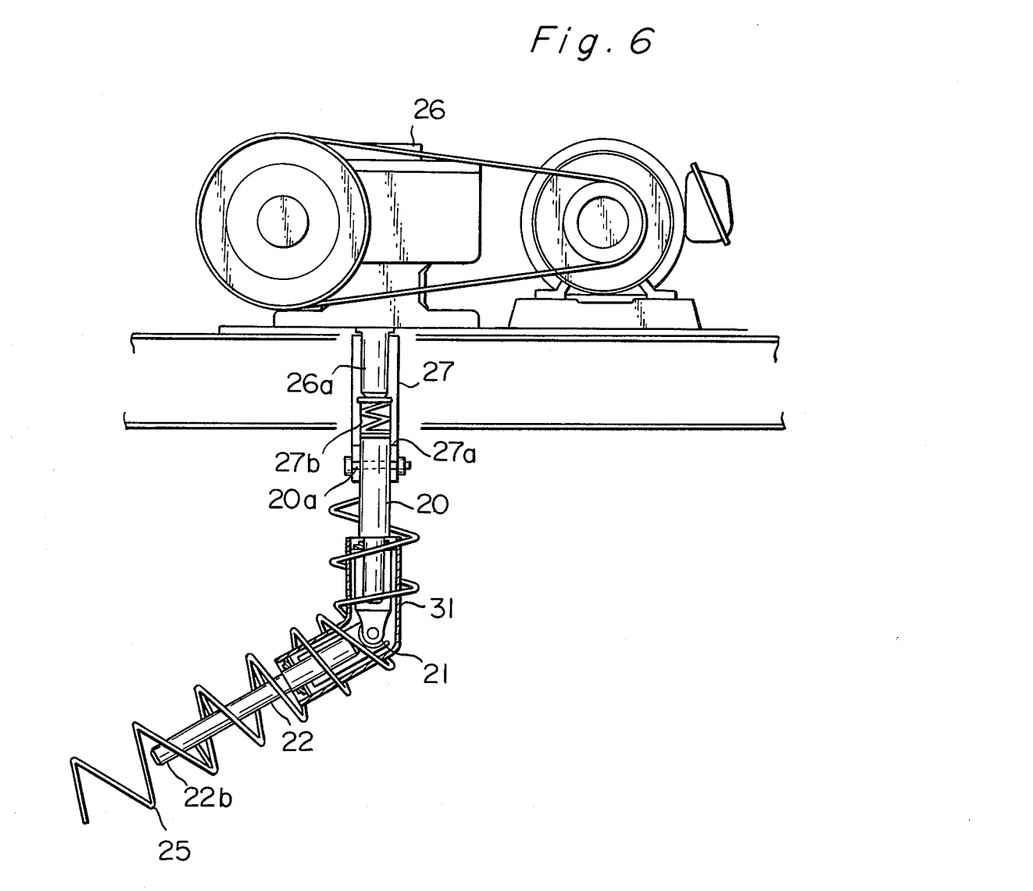
FIG. 6 is an enlarged side view illustrating another embodiment of a drive system to be used in the apparatus shown in FIG. 1.

A slot or long pin hole 27a perforated in the vertical direction is provided on the coupling mechanism 27 connecting the drive shaft 20 to the shaft 26a of the reduction gear 26, and the space 27b of the coupling mechanism 27 in which the drive shaft 20 is engaged is constructed to have such dimensions as will allow vertical movement of the drive shaft 20. Thus, the drive shaft 20 is inserted through said long pin hole 27a and is fitted to the coupling mechanism 27 by means of a pin 20a. In the above structure, the drive shaft 20 is arranged to that it can rotate and move vertically with respect to the coupling mechanism 27. A spring 27c is provided in the interior of the space 27b, so that a downward force is perpetually imparted to the drive shaft 20. Further, the end portion of the spiral spring member can be extended over the position of the supporting member 22 so that it can reach the drive shaft 20.

In this invention, various modifications can be made as far as the basic requirement that a spiral spring member 25 is supported at two points, namely at the upper end of the store tank and the lower end thereof (discharge end) and the rotation and revolution of the spiral spring member are concurrently performed is satisfied, and in each modification there can be similarly attained an advantage that flowable solid materials can be discharged stably and completely regardless of properties and shapes of flowable solid materials and variations of the operation conditions.

What I claim is:

1. An apparatus for storage and discharge of flowable solid materials which comprises:
   a storage tank having upper and lower portions and extending in an axial direction, wherein the upper portion has a space for storing flowable solid materials and the lower portion has a zone for discharging flowable solid materials;
   a discharge mechanism disposed in the interior of said storage tank, wherein said discharge mechanism includes a drive shaft disposed in the upper portion of said storage tank in the axial direction of said tank;
   an end member mounted rotatably on said discharge zone of the storage tank through a bearing mechanism and a spiral spring member, one end of which is fitted to said drive shaft and the other end of which extends to said end member;
   a coupling mechanism for connecting the drive shaft to the shaft of a reduction gear, said coupling mechanism having a space in which said drive shaft is fitted to move vertically and having a slot extending therein in the vertical direction, said drive shaft being engaged with said coupling mechanism by a pin inserted through said slot and a spring disposed in the interior of said space receiving said drive shaft to press the drive shaft downwardly;
   said discharge mechanism being so constructed that when said drive shaft is rotated by said reduction gear, said spring member is rotated by rotation of said drive shaft and concurrently is revolved along the inner wall of the storage tank.

2. The apparatus set forth in claim 1 wherein the storage tank comprises a cylindrical side wall portion, a conical bottom wall portion connected to the lower end of said side wall portion, and a lid disposed on the upper end of said side wall portion.

3. The apparatus set forth in claim 2 wherein said conical bottom wall portion has a vertical section which forms an inwardly convexed curve.

4. The apparatus set forth in claim 1 wherein a supporting member is attached to the lower end of said drive shaft through a universal joint, one end of said spiral spring member is attached to said supporting member, and the universal joint is disposed so that it allows a free displacement of the supporting member with respect to the drive shaft disposed in the vertical axial direction.

5. The apparatus set forth in claim 4 wherein one end of said supporting member is connected to one connecting portion of the universal joint, and the other end of said supporting member extends in the central axial direction of the spiral spring member over at least one fixing point at which the spiral spring member is fixed to said supporting member.

6. The apparatus set forth in claim 4 wherein a cover composed of an elastomeric polymer is disposed at the portion connecting the drive shaft to the supporting member, namely the portion of the universal joint, to prevent flowable solid materials from intruding into said portion.

7. The apparatus set forth in claim 1 wherein the spiral spring member is so supported by a supporting member that one end of the spiral spring member extends over the position of said supporting member and reaches the drive shaft.

8. The apparatus set forth in claim 1 wherein the upper end portion of said end member extending in the vertical direction is located at the point of a lower end opening of the conical bottom wall portion of the storage tank when the end member is at the normal supporting position.

9. The apparatus set forth in claim 8 wherein a spring-indicating shaft is pivotably mounted on the upper end portion of said end member, said spring-indicating shaft extending in the axial direction of said end member.

10. The apparatus set forth in claim 1 wherein said spiral spring member is rotated in the same direction as the spiralling direction of the spiral spring member seen from above so as to advance toward said end member.

11. The apparatus set forth in claim 1 wherein said spiral spring member is driven and rotated at a rotation rate of 30 to 100 rpm.

12. The apparatus set forth in claim 1 wherein said spiral spring member is composed of a linear metallic material.

13. The apparatus set forth in claim 1 wherein said spiral spring member is composed of a band-like metallic material.

14. The apparatus set forth in claim 1 wherein said spiral spring member has a coating of a resin or rubber excellent in abrasion resistance.

15. An apparatus for storage and discharge of flowable solid materials which comprises:
   a storage tank having upper and lower portions and extending in an axial direction, wherein the upper portion has a space for storing flowable solid materials and the lower portion has a zone for discharging flowable solid materials;
   a discharge mechanism disposed in the interior of said storage tank, wherein said discharge mechanism includes a drive shaft disposed in the upper portion of said storage tank in the axial direction of said tank;
   an end member mounted rotatably on said discharge zone of the storage tank through a bearing mechanism and a spiral spring member, one end of which is fitted to said drive shaft and the other end of which extends to said end member;
   a bearing mechanism provided in the discharge zone of the storage tank and extending through a supporting member, said bearing mechanism rotatably supporting said end member and said end member extending vertically in alignment with the axial extent of the spiral spring member, the lower end of the spring member being fixed to said end member at at least one fixing point;
   a vertically movable shaft member connected to the lower end of said end member and supported by said bearing mechanism for vertical and rotatable motion relative thereto;

a stopper mounted on the lowermost end of said vertically movable shaft to retain said vertically movable shaft within said bearing means;

said discharge mechanism being so constructed that when said drive shaft is rotated, said spring member is rotated by rotation of said drive shaft and concurrently is revolved along the inner wall of the storage tank.

16. The apparatus set forth in claim 15 wherein coil springs acting as shock absorbers are disposed around said vertically movable shaft between the stopper and bearing mechanism and between said spiral spring member and bearing mechanism, respectively.

* * * * *